United States Patent
Parihar et al.

(10) Patent No.: US 11,284,305 B1
(45) Date of Patent: Mar. 22, 2022

(54) SYSTEMS AND METHODS FOR DYNAMIC BUFFER MODIFICATION BASED ON APPLICATION CATEGORY

(71) Applicant: Sprint Spectrum LP, Overland Park, KS (US)

(72) Inventors: Vanil Parihar, Overland Park, KS (US); Sreekar Marupaduga, Overland Park, KS (US); Rajveen Narendran, Olathe, KS (US); Rashmi Kumar, Herndon, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 183 days.

(21) Appl. No.: 16/823,806

(22) Filed: Mar. 19, 2020

(51) Int. Cl.
| | |
|---|---|
| *H04W 28/18* | (2009.01) |
| *H04L 5/00* | (2006.01) |
| *H04L 47/52* | (2022.01) |
| *H04L 41/0896* | (2022.01) |
| *H04W 72/04* | (2009.01) |
| *H04W 28/02* | (2009.01) |
| *H04W 28/24* | (2009.01) |
| *H04W 48/16* | (2009.01) |

(52) U.S. Cl.
CPC .......... *H04W 28/18* (2013.01); *H04L 5/001* (2013.01); *H04L 5/0062* (2013.01); *H04L 41/0896* (2013.01); *H04L 47/522* (2013.01); *H04W 28/0268* (2013.01); *H04W 28/24* (2013.01); *H04W 48/16* (2013.01); *H04W 72/0453* (2013.01)

(58) Field of Classification Search
CPC . H04W 28/18; H04W 28/0268; H04W 28/24; H04W 48/16; H04W 72/0453; H04L 5/001; H04L 5/0062; H04L 41/0896; H04L 47/522; H04L 1/0001; H04L 47/76; H04L 47/18; H04B 1/7075
See application file for complete search history.

(56) References Cited

U.S. PATENT DOCUMENTS

| | | | |
|---|---|---|---|
| 9,955,506 B2 | 4/2018 | Rahman et al. | |
| 2011/0264818 A1* | 10/2011 | Riggert | H04L 65/4053 709/231 |
| 2014/0079016 A1* | 3/2014 | Dai | H04W 72/0453 370/330 |
| 2017/0245316 A1* | 8/2017 | Salkintzis | H04W 48/16 |
| 2019/0032652 A1* | 1/2019 | McCarthy | F04B 49/002 |
| 2019/0373032 A1* | 12/2019 | Kumar | H04L 65/602 |

FOREIGN PATENT DOCUMENTS

WO   WO-2020166461 A  *  8/2020  .............. G06F 9/50

* cited by examiner

*Primary Examiner* — Mewale A Ambaye

(57) ABSTRACT

A method is provided for dynamically modifying a buffer in a network deploying multiple carriers, wherein multiple wireless devices communicate over the network. The wireless devices run applications, each application belonging to an application category. The method includes identifying the application category for a selected wireless device communicating over the network, wherein a first application category requires at least one of high throughput and low latency. The method additionally includes reducing a size of the buffer when the application category is the first application category, thereby initiating carrier aggregation for the selected wireless device.

18 Claims, 5 Drawing Sheets

SYSTEMS AND METHODS FOR DYNAMIC BUFFER MODIFICATION BASED ON APPLICATION CATEGORY

TECHNICAL BACKGROUND

A wireless network, such as a cellular network, can include an access node (e.g., base station) serving multiple wireless devices or user equipment (UE) in a geographical area covered by a radio frequency transmission provided by the access node. As wireless networks evolve and grow, there are ongoing challenges in providing high-quality service to increasing numbers of wireless devices. One approach to improving service quality and coverage is to implement carrier aggregation (CA), i.e., enabling wireless devices and access nodes to communicate using a combination of carriers, i.e., component carriers.

The determination of when devices should operate in CA mode for optimal network load balancing can be a challenge and current methods do not adequately consider the various usage types of the wireless devices. For example, different applications running on the wireless devices may have different characteristics. Some applications require high instantaneous throughput, low latency, or high quality of service (QoS). Other applications require average throughput or low quality of service. Applications requiring average throughput may successfully operate on a network without experiencing interruption or slow service without implementation of CA. However, devices running applications requiring a high QoS, low latency, or high throughput may experience unsatisfactory service when CA is not implemented.

Further, as technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), and 5G RATs (new radio (NR)). Deployment of the evolving RATs in a network provides numerous benefits and various RATs have advantages over other RATs. For example, newer RATs may provide additional resources to subscribers, greater network coverage, faster communications speeds, and other advantages. However, the additional resources are not necessary to accommodate every application and wireless device. Excessive utilization of one technology over other available technologies can overburden some carriers and result in excessive capacity for other carriers.

Determination of when to implement CA and which component carriers to select as primary cell (PCell) carriers or secondary cell (SCell) carriers creates numerous challenges for network operators. Because multiple applications are in use over the network simultaneously, applications requiring high throughput, low latency, or high quality of service can over-load the network and result in slower service or service interruptions. Further, when newer RATs are employed, network resources devoted to pre-existing RATs may be under-utilized, thereby resulting in a waste of network resources and capacity. Therefore, there is a need for systems and methods that can improve overall service quality and resource utilization within a wireless network.

OVERVIEW

Exemplary embodiments described herein include systems, methods, and processing nodes for modifying a buffer based on usage of a wireless device. An exemplary method is described herein for dynamically modifying a buffer in a network deploying multiple carriers, Multiple wireless devices communicate over the network and the wireless devices are capable of running one or more application. Each application belongs to an application category. The method includes identifying the application category for a selected wireless device communicating over the network, wherein a first application category requires at least one of high throughput and low latency. The method additionally includes reducing a size of the buffer when the application category is the first application category, thereby initiating CA for the selected wireless device.

An exemplary system is described herein for modifying a buffer size in a network deploying multiple carriers. Multiple wireless devices communicate over the network and may run one or more application, each application belonging to an application category. The system includes a processing node and a processor communicably coupled to the processing node. The processor enables the processing node to perform multiple operations. The operations include identifying the application category for a selected wireless device communicating over the network, wherein a first application category requires at least one of high throughput and low latency. The operations additionally include reducing a size of the buffer when the application category is the first application category and generating an instruction to the wireless device to operate in CA mode when the available buffer space for the selected wireless device reaches a predetermined threshold.

An exemplary processing node described herein for dynamic buffer modification is configured to perform various operations. The processing node dynamically modifies a buffer in a network deploying multiple carriers, wherein multiple wireless devices communicate over the network and each wireless device runs at least one of multiple applications. Each application belongs to an application category. The processing node performs multiple operations including identifying the application category for a selected wireless device communicating over the network, wherein a first application category requires at least one of high throughput and low latency and a second application category requires an average throughput. The processing node further reduces a size of the buffer for the selected wireless device when the application category is the first application category and increases the size of the buffer for the selected wireless device when the application category is the second application category.

DETAILED DESCRIPTION

Figure 1:
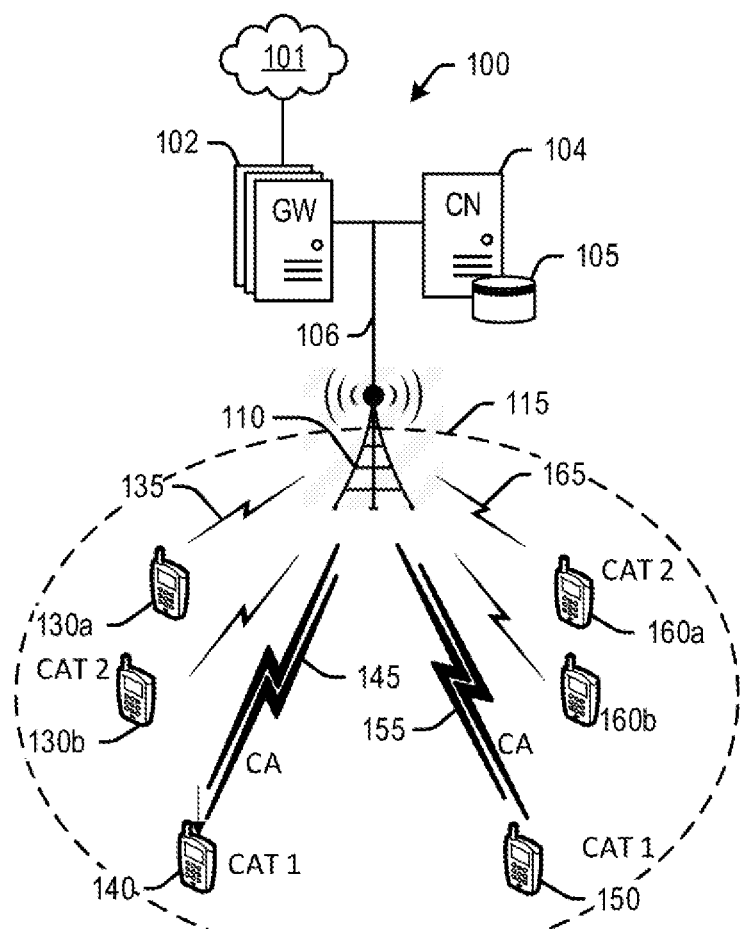
FIG. 1 depicts an exemplary system for wireless communication, in accordance with the disclosed embodiments.

Exemplary embodiments described herein include systems, methods, and processing nodes for dynamic buffer modification based on application usage by wireless devices. The disclosed systems and methods may be implemented in any wireless network in which two or more component carriers operate. For example, the network may use an EN-DC 5G standalone new radio (NR) architecture and thus support both NR and LTE RATs.

A cell or wireless network may be provided by an access node. The access node may communicate with multiple wireless devices or UEs. One or more network buffers in communication with the access node may be associated with the triggering of CA, which allows wireless devices to connect to different component carries including a PCell carrier and an SCell carrier. The network buffer may be configured as an SCell activation buffer, such that when the buffer is full, CA is triggered to allow the connected wireless devices to use an SCell carrier in addition to the PCell carrier. The buffer may be structured such that each device operating in the network has a virtual allotment of buffer space. Thus, when the virtual allotment of buffer space for a particular device is full, CA may be triggered for that particular device.

While, in conventional applications, the network buffer size is fixed, embodiments disclosed herein implement dynamic modification of buffer size, including the virtual space allotted to each wireless device connected over the network. Thus, embodiments disclosed herein selectively modify the buffer size allotted to a selected wireless device in accordance with detection of an application category for the selected wireless device. Specifically, the network buffer size allotted to a particular device is decreased if it is advantageous to trigger CA for the selected wireless device and the buffer size is increased if it is not advantageous to trigger CA for the selected wireless device.

The use of multiple carriers by one wireless device or CA enables multiple carriers to increase the bandwidth available to the wireless device. Thus, reduction in the size of a buffer associated with the PCell can be triggered in order to cause one or more wireless devices to utilize the SCells, in order to utilize CA and maintain a balanced network load. In embodiments disclosed herein, application categories are defined in order to facilitate maintenance a balanced network load. A first category of applications includes applications requiring high throughput or low latency. This first category of applications includes, for example, speed test applications, which require peak instantaneous throughput, gaming, multimedia streaming, and other interactive applications, which require low latency, and data intensive applications that require high throughput. A second category of applications includes other applications such as native wireless device applications, navigation applications, and those applications requiring a low QoS.

For wireless devices utilizing CA, the particular use of the PCell and SCells can vary. For example, all uplink transmissions may be performed by the PCell and all downlink transmissions may be performed by the SCell. Alternatively, the PCell and SCell may be determined based on transmission channels. Downlink transmission channels include a physical downlink control channel (PDCCH) and a physical downlink shared channel (PDSCH) and uplink control channels including a physical uplink control channel (PUCCH) and a physical uplink shared channel (PUSCH) may be designated for use by the PCell or SCell.

The present disclosure provides dynamic buffer modification based on application category in order to maintain a balanced network load and avoid interference and reductions in service quality. The dynamic buffer modification may be triggered based on a detected category of application running on a selected wireless device. In some embodiments, the dynamic buffer modification may be triggered based on use of an application requiring high throughput and the device may be instructed to utilize a PCell carrier and an SCell carrier. Embodiments may utilize and ENDC architecture, which allows devices to access both LTE and 5G simultaneously on the same spectrum band. Through this technology, wireless devices running applications in a particular category receive the benefit of capacity from both an LTE network as well as a 5G network. For wireless devices running applications requiring a low quality of service, the buffer size may be increased to avoid triggering of CA because CA is not deemed necessary for maintaining service quality delivered to that wireless device.

In embodiments, the application category is determined based on an indicator received from the wireless device, such as, for example, in an attach request. The wireless device may request a connection to the access node, either for the first time, or upon resuming from an idle state. In additional exemplary embodiments, the indicator may include an application identifier of the application running on the wireless device. The application category may additionally or alternatively be determined based on the QoS Class Identifier (QCI), which is a mechanism used in LTE networks to ensure bearer traffic is allocated appropriate QoS. The application category may further be determined based on a capability report received from the wireless device, a wireless device type, or information contained in packet headers. Other techniques for determining application category are within scope of the disclosure.

Conventional systems trigger CA based on the needs of wireless devices. For example, CA may be triggered when data stored in a buffer of the wireless device meets a buffer occupancy limit. However, this CA scheme does not operate to balance the resources of the network as a whole. The present disclosure enables CA to be dynamically triggered by modifying a network buffer size based on an application category indicative of device requirements, which may be determined in real time. Specifically, a dynamic reduction in network buffer size may be triggered for wireless devices running applications in a first category and a dynamic increase in network buffer size may be triggered for wireless devices running applications in a second category. The reduction in buffer size triggers CA, while the increase in buffer size delays implementation of CA. This results in an improvement to the overall performance of the network and service to the individual wireless devices.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

The terms "transmit" and "transmission" in data communication may also encompass receive and receiving data. For example, "data transmission rate" may refer to a rate at which the data is transmitted by a wireless device and/or a rate at which the data is received by the wireless device.

An exemplary system described herein includes at least an access node (or base station), such as an eNodeB, a gigabit NodeB (gNodeB), and a plurality of end-user wireless devices. For illustrative purposes and simplicity, the disclosed technology will be illustrated and discussed as being implemented in the communications between an access node (e.g., a base station) and a wireless device (e.g., an end-user wireless device). It is understood that the disclosed technology may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations for dynamic buffer modification may be implemented as computer-readable instructions or methods, and processing nodes on the network for executing the instructions or methods. The processing node may include a processor included in the access node or a processor included in any controller node in the wireless network that is coupled to the access node.

FIG. 1 depicts an exemplary system for wireless communication. System 100 may be a wireless communication network, such as a cellular network. System 100 may include a communication network 101, a gateway 102, a controller node 104, and one or more access nodes 110. One or more end-user wireless devices may be directly connected to access node 110, such as end-user wireless devices 130a, 130b, 140, 150, 160a, and 160b.

In this exemplary embodiment, access node 110 may be a macrocell access node configured to deploy at least two different carriers. For example, a first carrier may be deployed by access node 110 in an LTE mode, and a second carrier may be deployed by access node 110 in an NR mode. Thus, in an embodiment, access node 110 may comprise two co-located cells, or antenna/transceiver combinations that are mounted on the same structure. In some embodiments, multiple access nodes 110 may be deployed and each access node 110 may support a different RAT. For example, a gNodeB may support NR and an eNodeB may provide LTE coverage. The carriers may further utilize different frequency bands or sub-bands and additionally may be deployed using different types of multiplexing modes. In other embodiments, any other combination of access nodes and carriers deployed therefrom may be evident to those having ordinary skill in the art in light of this disclosure.

Wireless devices 130a, 130b, 140, 150, 160a, and 160b are illustrated as being in communication with access node 110 over various types of communication links. Each of the end-user wireless devices 130a, 130b, 140, 150, 160a, and 160b may be attached to the wireless air interface deployed by access node 110. Wireless links 135 and 165, as well as other wireless links that directly couple end-user wireless devices 140a, 140b, 140c, and 140d with access node 110, as shown in FIG. 1, form the wireless network (or wireless radio air interface) deployed by access node 110 within coverage area 115.

In disclosed embodiments, wireless devices 130a and 130b are illustrated as being in communication with access node 110 using a first carrier, which may provide a communication link 135. Wireless devices 130a and 130b are shown as running applications in a second category and thus are using only one carrier. The communication link 135 may comprise any communication channel that utilizes air-interface resources of a carrier, such as an NR carrier or LTE carrier deployed by access node 110. Wireless devices 160a and 160b may be in communication with the access node 110 over a second communication link 165, which may also be provided, for example by an NR carrier or LTE carrier or other type of carrier connected to the access node 110. As illustrated, the wireless devices 160a and 160b are also shown as running applications identified as belonging to the second category and are thus using only one carrier. Further, wireless devices 140 and 150 are illustrated as being in communication with access node 110 over communication links 145 and 155 respectively. The wireless devices 140 and 150 are shown as running applications belonging to the first category. Thus, the communication links 145 and 155 utilize a CA operating mode, i.e. they utilize wireless air interface resources from more than one carrier. For example, communication link 145 may utilize air-interface resources of at least one carrier utilizing an NR RAT and one carrier utilizing an LTE RAT. Alternatively, both carriers may use the same RAT. Any alternative carrier connected with the access node 110 may be used. In embodiments an NR carrier is utilized as a primary carrier and at least on LTE carrier is utilized as a secondary carrier. Other configurations are within scope of the disclosure.

Further, network buffers may be located within the access node 110, gateway node 102, controller node 104, database 105 or other location. In conventional implementations, network buffer sizes are fixed. However, in embodiments disclosed herein, the access node 110, a processing node communicatively coupled to access node 110, or any other node within system 100, may be configured to dynamically modify buffer sizes to provide a better overall throughput experience for wireless device users. The network buffer described herein may operate as an SCell activation buffer such that reduction in the size of the buffer may result in a predetermined threshold amount of buffer space available. The lack of available buffer space for a selected wireless device. may trigger CA and thus cause utilization of both a PCell and an SCell by the selected wireless device. For example, the network buffer may include a portion allotted to each wireless device connected within the network. If a selected wireless device is running an application identified as falling within the first category of applications, the size of the network buffer allotted to the selected wireless device may be decreased in order to cause SCell activation and CA. Alternatively, if the selected wireless device is running an application identified as falling within the second category, the buffer size allotted to the wireless device may be increased, thus delaying implementation of CA and the implementation of an SCell for the selected wireless device. Modification of the buffer size can be configured to provide a superior throughput experience based on the applications running on the wireless devices. Upon dynamic reduction of the buffer size, one or more wireless devices may be instructed to operate in CA mode, i.e. to utilize resources from both a PCell and an SCell. In some embodiments, the PCell may be an NR carrier and the SCell may be an LTE carrier. However, both the PCell and the SCell may utilize the same RAT. Also, a dynamic increase in the buffer size for wireless devices running the second category of applications delays triggering of CA.

Access node 110 can be any network node configured to provide communication between wireless devices 130a, 130b, 140, 150, 160a, and 160b and communication network 101, including standard access nodes such as a macro-cell access node, base transceiver station, a radio base station, an eNodeB device, an enhanced eNodeB device, a gNodeB device or the like. In an exemplary embodiment, a macro-cell access node can have a coverage area 115 in the range of approximately five kilometers to thirty-five kilometers and an output power in the tens of watts. Alternatively, access node 110 may comprise a short range, low power, small-cell access node such as a microcell access node, a picocell access node, a femtocell access node, or a home eNodeB device.

Access node 110 may be any network node configured to provide communication between end-user wireless devices 130a, 130b, 140, 150, 160a, and 160b and communication network 101, including standard access nodes such as a macro-cell access node, a base transceiver station, a radio base station, an eNodeB device, an enhanced eNodeB device, a gigabit NodeB (or gNodeB) in 5G New Radio ("5G NR"), or the like. For example, access node 110 may implement 5G NR technologies to deploy a wireless network that supports frequency bands ranging from, e.g., 600 MHz to 100 GHz. In some embodiments, access node 110 may deploy a wireless network that supports frequency bands ranging from 3 GHz to 100 GHz. In some embodiments, access node 110 may deploy a wireless network that supports multiple frequency bands selected from 3 GHz to 100 GHz. In an exemplary embodiment, a macro-cell access node 110 may have a coverage area 115 in the range of approximately five kilometers to thirty-five kilometers and an output power in the tens of watts. In an embodiment, access node 110 may comprise two co-located cells, or antenna/transceiver combinations that are mounted on the same structure. In other embodiments, any other combination of access nodes and carriers deployed therefrom may be evident to those having ordinary skill in the art in light of this disclosure.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node 102 and controller node 104 via communication link 106. Access node 110 may communicate with other access nodes (not shown), using a wireless link or a wired link such as an X2 link. Components of exemplary access nodes 110 are further described with reference to FIG. 2.

Wireless devices 130a, 130b, 140, 150, 160a and 160b may be any device, system, combination of devices, or other such communication platform capable of communicating wirelessly with access node 110 using one or more frequency bands and wireless carriers deployed therefrom. Each of wireless devices 130a, 130b, 140, 150, 160a, 160b may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. The wireless devices may be or include high power wireless devices or standard power wireless devices. Other types of communication platforms are possible.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals and carrying data, for example, to support voice, push-to-talk, broadcast video, and data communications by end-user wireless devices 130a, 130b, 140, 150, 160a, and 160b. Wireless network protocols may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network protocols.

Communication link 106 may use various communication media, such as air, laser, metal, optical fiber, or other signal propagation path, including combinations thereof. Communication link 106 may be wired or wireless and may use various communication protocols such as Internet, Internet protocol (IP), local-area network (LAN), optical networking, hybrid fiber coax (HFC), telephony, T1, or other communication format, including combinations, improvements, or variations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. In some embodiments, communication link 106 may include Si communication links. Other wireless protocols may also be used. Communication link 106 may be a direct link or may include various intermediate components, systems, and networks. Communication link 106 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long-Term Evolution (LTE) or 5G NR, and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a stand-alone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long-Term Evolution (LTE) or 5G NR, and may be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as types and duplexing methods of carriers deployed by access node 110, power classes and CA capabilities of wireless devices 130a, 130b, 140, 150, 160a, and 160b associations therebetween. This information may be requested by or shared with access node 110 via communication link 106, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
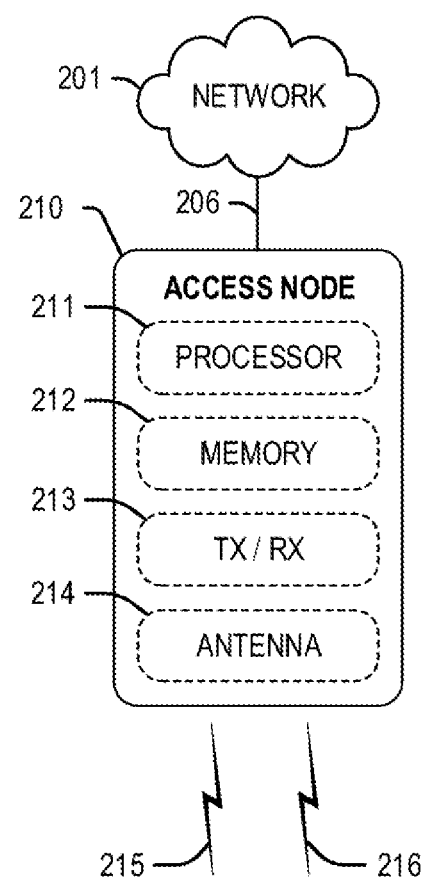
FIG. 2 depicts an exemplary access node, in accordance with the disclosed embodiments.

FIG. 2 depicts an exemplary access node 210. Access node 210 may comprise, for example, a macro-cell access node, such as access node 110 described with reference to FIG. 1. Access node 210 is illustrated as comprising a processor 211, memory 212, transceiver 213, and antenna 214. Processor 211 executes instructions stored on memory 212, while transceiver 213 and antenna 214 enable wireless communication with other network nodes, such as wireless devices and other nodes. For example, access node 210 may be configured to deploy at least two different carriers 215, 216. The carriers 215 and 216 may utilize different RATs. For example, a first carrier 215 utilizing a first RAT may be deployed by access node 210, and a second carrier 216 utilizing a second RAT may be deployed by access node 210. These features may be enabled by access node 210 comprising two co-located cells, or antenna/transceiver combinations that are mounted on the same structure. Network 201 may be similar to network 101 discussed above. CA mode, during which a wireless device utilizes more than one carrier, enables the wireless devices to communicate with access node 210 using a combination of resources from both carriers 215 and 216.

Figure 4:
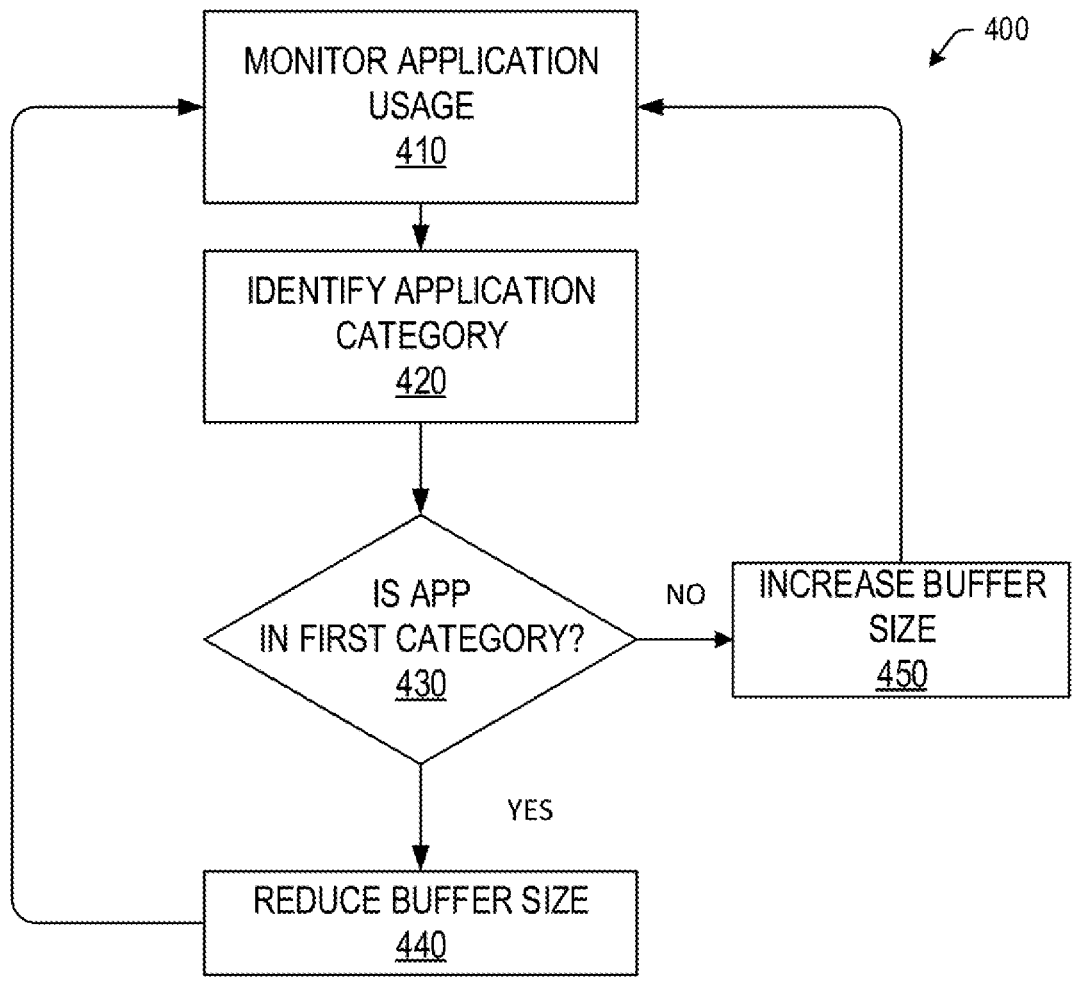
FIG. 4 depicts an exemplary method for dynamically modifying a buffer based on application category in accordance with the disclosed embodiments.

Further, instructions stored on memory 212 can include instructions for buffer modification, as will be further explained below with reference to FIGS. 4 and 5. The instructions may facilitate determination of an application category for each wireless device running an application. For example, the instructions may determine the application category based on an indicator received from each wireless device running and application. The instructions further may allow adjustment of buffer size allotted to each wireless device based on the identified application category. In embodiments, the adjustment occurs dynamically to control implementation of CA for each wireless device connected over the network. Upon reduction of the network buffer size allotted to a particular wireless device, the wireless device may be instructed to operate in CA mode in order to balance the network load. Further, upon increase in the network buffer size allotted to a particular wireless device, the wireless device may be instructed to delay implementation of CA in order to keep the network load balanced.

Figure 3:
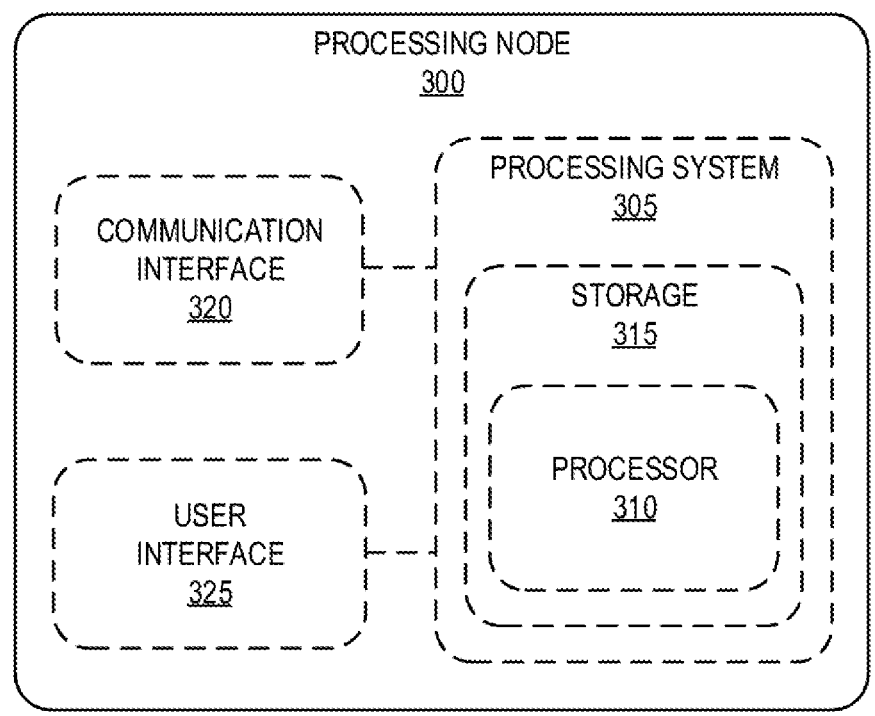
FIG. 3 depicts a processing node for facilitating buffer size modification, in accordance with the disclosed embodiments

FIG. 3 depicts an exemplary processing node 300, which may be configured to perform the methods and operations disclosed herein for dynamic buffer modification. In some embodiments, processing node 300 may be included in an access node, such as access node 110 or 210. In further embodiments, processing node 300 may be included in controller node 104 and may be configured for controlling the access nodes.

Processing node 300 may be configured for performing dynamic buffer modification for one or more buffers in a network. As explained above, the network buffer may have space allotted to each wireless device. In embodiments disclosed herein, the allotment may be a virtual allotment. The buffer modification may be performed dynamically in real time based the category of an application running on each wireless device. Processing node 300 may include a processing system 305. Processing system 305 may include a processor 310 and a storage device 315. Storage device 315 may include a disk drive, a flash drive, a memory, or other storage device configured to store data and/or computer readable instructions or codes (e.g., software). The computer executable instructions or codes maybe accessed and executed by processor 310 to perform various methods disclosed herein. Software stored in storage device 315 may include computer programs, firmware, or other form of machine-readable instructions, including an operating system, utilities, drivers, network interfaces, applications, or other type of software. For example, software stored in storage device 315 may include a module for performing various operations described herein. Processor 310 may be a microprocessor and may include hardware circuitry and/or embedded codes configured to retrieve and execute software stored in storage device 315.

Processing node 300 may include a communication interface 320 and a user interface 325. Communication interface 320 may be configured to enable the processing system 305 to communicate with other components, nodes, or devices in the wireless network. Communication interface 320 may include hardware components, such as network communication ports, devices, routers, wires, antenna, transceivers, etc. User interface 325 may be configured to allow a user to provide input to processing node 300 and receive data or information from processing node 300. User interface 325 may include hardware components, such as touch screens, buttons, displays, speakers, etc. Processing node 300 may further include other components such as a power management unit, a control interface unit, etc.

The disclosed methods for dynamic buffer modification are discussed further below. FIG. 4 illustrates an exemplary method 400 for dynamic buffer modification based on identification of application categories for the wireless devices communicating over the network. The method 400 may be performed by any suitable processor discussed herein, for example, a processor included in access node 110 or 210, processor 310 included in processing node 300, or a processor included in controller node 104. For discussion purposes, as an example, method 400 is described as being performed by a processor included in access node 110.

Method 400 starts in step 410 and may include monitoring application usage for each wireless device. In embodiments, monitoring occurs based on attach requests transmitted from each wireless device. For example, upon being connected or resuming operation from an idle state, a wireless device may transmit an attach request to the access node 110. The attach request may include user equipment (UE) capability information, including a capability of the wireless device to operate in CA mode. In other embodiments, the UE capability information may be separately submitted to the access node in response to a capability inquiry. The attach request may further include an application identifier, packet identifier, deep packet inspection, QCI, or other indicator that identifies an application running on the wireless device. In an embodiment, an application requirement may be obtained from a QoS requirement, which may include one or more service conditions for a wireless transmission, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. For example, where an application of the wireless device comprises streaming video, the application requirements for the wireless device may comprise a minimum bit rate, a maximum permitted delay, a maximum error rate, and any other suitable application requirement.

In step 420, the access node 110 may determine an application category based on the application characteristics monitored in step 410. In embodiments disclosed herein, two application categories are defined, and each application is identified as belonging on one of the two categories based on the information described above with respect to step 410. The application categories for the selected wireless device may be determined in real time or at predetermined time intervals (e.g., every 1 minute, 2 minutes, 5 minutes, etc.). In some embodiments, the application category determinations may be performed in real time as the wireless devices may constantly transmit attach requests to access node 110.

The first defined application category may include applications requiring low latency and/or high throughput. Such applications may include, for instance, speed test applications, multimedia streaming applications, interactive gaming applications, or other applications that, when executed require a high throughput or low latency to operate efficiently. Such applications in the first category may also include applications requiring a high QoS. The second application category generally encompasses applications that do not fall into the first category. However, the second application category can be more narrowly defined to include applications that require a low QoS, low throughput, or average throughput. Further, regardless of the application, if a wireless device, based on its reported information is deemed incapable of CA, the wireless device may be identified as running an application belonging in the second category.

Method 400 may include a decision block in step 430. If the application is identified as belonging to the first category in step 420, the method moves to step 440 to reduce the buffer size for the selected wireless device. As set forth above, the network may be an SCell activation network buffer divided into portions, which may be virtual portions, allotted to each wireless device. Thus, the buffer allotment for the selected wireless device is reduced in step 440 when the application belongs to the first category. In embodiments, a pre-set threshold for available network buffer space for each wireless device is programmed for activating CA for the selected wireless device. Thus, when available buffer space for the selected wireless device reaches the pre-set threshold, the wireless device begins operating in CA mode. In embodiments, the buffer size is reduced according to a pre-selected percentage for category one applications. However, in alternative embodiments, the size reduction may be based on particular characteristics of the category one application. For example, a category one application requiring peak instantaneous throughput may trigger a larger percentage decrease in buffer size than other category one applications.

If the application does not belong to the first category in step 430, then the application may be determined to belong to the second application category and the buffer size may be increased in step 450 for the selected wireless device. The increase in buffer size delays the initiation of CA for the wireless device as CA is not deemed necessary to balance network load or to effectively serve the wireless device. The buffer size may be increased by a predetermined percentage or alternatively, for some devices, the percentage increase may be larger. For example, devices not capable of CA may have the corresponding buffer size increased by a greater percentage than other devices running category two applications. Upon altering the buffer size, the access node 110 continues monitoring the selected wireless devices for a change in application usage.

Figure 5:
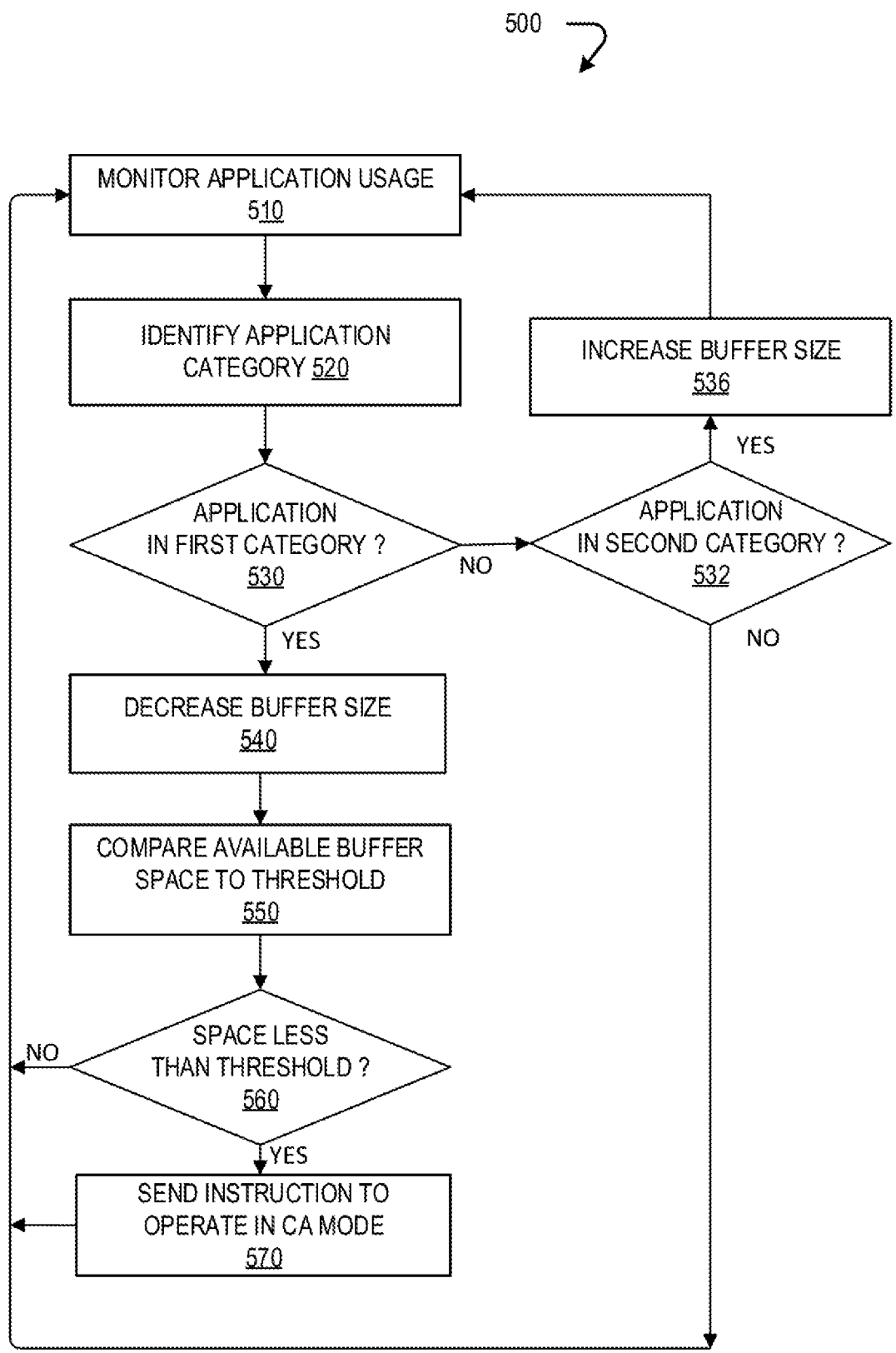
FIG. 5 depicts another exemplary method for dynamically modifying a buffer size based on application category multiple loads in accordance with the disclosed embodiments.

FIG. 5 depicts another exemplary method 500 for dynamically modifying a buffer size and initiating CA based on an application type in accordance with the disclosed embodiments. Method 500 may be performed by any suitable processor discussed herein, for example, a processor included in access node 110 or 210, processor 310 included in processing node 300, or a processor included in controller node 104. For discussion purposes, as an example, method 500 is described as being performed by a processor included in access node 110. Compared with method 400, method 500 includes additional steps or operations.

Method 500 may begin in step 510 in which application usage is monitored for a selected wireless device. In embodiments, application usage of all connected wireless devices is monitored in real time. In embodiments, monitoring occurs based on attach requests transmitted from each wireless device. For example, upon being connected or resuming operation from an idle state, a wireless device may transmit an attach request to the access node 110. The attach request may include user equipment (UE) capability information, including a capability of the wireless device to operate in CA mode. In other embodiments, the UE capability information may be separately submitted to the access node in response to a capability inquiry. The attach request may further include an application identifier, packet identifier, deep packet inspection, QCI, or other indicator that identifies an application running on the wireless device. In an embodiment, an application requirement may be obtained from a QoS requirement, which may include one or more service conditions for a wireless transmission, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. For example, where an application of the wireless device comprises streaming video, the application requirements for the wireless device may comprise a minimum bit rate, a maximum permitted delay, a maximum error rate, and any other suitable application requirement.

In step 520, the access node 110 identifies an application category for each wireless device being monitored. In embodiments disclosed herein, two application categories may be defined. In the illustrated embodiment, applications may fall into one of the two categories or may not fall in either category. The first defined application category may include applications requiring low latency and/or high throughput. Such applications may include, for instance, speed test applications, multimedia streaming applications, interactive gaming applications, or other applications that, when executed require a high throughput or low latency to operate efficiently. Such applications in the first category may also include applications requiring a high QoS. The second application category generally encompasses applications that do not fall into the first category. However, the second application category can be more narrowly defined to include applications that require a low QoS, low throughput, or average throughput. Further, regardless of the application, if a wireless device, based on its reported information is deemed incapable of CA, the wireless device may be identified as running an application belonging in the second category. In the illustrated embodiment, it is possible that an application may not fall into either defined category.

Method 500 may include a decision block in step 530. If the application is identified as belonging to the first category in step 520, the method moves to step 540 to reduce the buffer size for the selected wireless device. As set forth above, the network may be an SCell activation network buffer divided into portions, which may be virtual portions, allotted to each wireless device. Thus, the buffer allotment for the selected wireless device is reduced in step 540 when the application belongs to the first category.

In embodiments, a pre-set threshold of available buffer space for a wireless device may trigger CA for the selected wireless device. Thus, in step 550, the method compares the available buffer space for the selected wireless device to the pre-set threshold. If the space is not less than the threshold in step 560, the system returns to a monitoring state in step 510. If the space is less than the threshold in step 560, the access node 110 may send an instruction to the selected wireless device to operate in CA mode and the selected wireless device begins operating in CA mode. In embodiments, the buffer size is reduced according to a pre-selected percentage for category one applications. However, in alternative embodiments, the size reduction may be based on particular characteristics of the category one application. For example, a category one application requiring peak instantaneous throughput may trigger a larger percentage decrease in buffer size than other category one applications.

Returning to step 530, if the application is not in the first category, the access node 110 determines if the application is in the second category in step 532. If the application is in the second category in step 532, the system increases the buffer size in step 536 and returns to monitoring in step 510. However, if the application does not fall into the second category in step 532, then the system may return to monitoring at step 510 without modifying the buffer size for the selected wireless device.

Although not shown, steps of the method 500 may be incorporated into the method 400 to allow for dynamic modifications to buffer size to trigger optimal utilization of the network. Furthermore, while the displayed methods include buffer modification and may also include steps for triggering CA, entirely separate methods may be performed by the system simultaneously with the buffer modification in order to trigger CA when appropriate. These methods may also be executed by the displayed system in real time.

In some embodiments, methods 400 and 500 may include additional steps or operations. All displayed methods may, for example dynamically modify the sizes of SCell activation buffers to control initiation of CA. Furthermore, the methods may include steps shown in each of the other methods. Further, the methods may determine buffer sizes for optimal network usage so that wireless carriers receive full benefit of available network resources and throughput will be improved for end users. As one of ordinary skill in the art would understand, the methods 400 and 500 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for dynamically modifying a buffer in a network deploying multiple carriers, wherein multiple wireless devices communicate over the network and each wireless device runs one of multiple applications, each application belonging to an application category, the method comprising:
   identifying the application category for a selected wireless device communicating over the network, wherein a first application category requires at least one of high throughput and low latency;
   reducing a size of the buffer when the application category is the first application category; and
   generating an instruction to the selected wireless device to operate in carrier aggregation mode when available buffer space reaches a predetermined threshold, thereby initiating carrier aggregation for the selected wireless device.

2. The method of claim 1, wherein a second application category requires an average throughput and the method further comprises increasing the buffer size when the application category is the second application category.

3. The method of claim 1, wherein the first application category includes applications requiring peak instantaneous throughput.

4. The method of claim 1, wherein identifying the application category includes reviewing an attach request received from the selected wireless device, the attach request including application characteristics.

5. The method of claim 1, wherein the first application category includes applications requiring a high quality of service.

6. The method of claim 1, wherein the first application category includes speed test applications, multimedia streaming applications, and gaming applications.

7. The method of claim 2, wherein the second application category includes applications requiring a low quality of service.

8. The method of claim 1, wherein the buffer includes space corresponding to the selected wireless device and the method includes reducing a size of the buffer space corresponding to the selected wireless device.

9. A system for dynamically modifying a buffer size in a network deploying multiple carriers, wherein multiple wireless devices communicate over the network and each wireless device runs one of multiple applications, each application belonging to an application category, the system comprising:
   a processing node; and
   a processor communicably coupled to the processing node, the processor for enabling the processing node to perform operations comprising:
   identifying the application category for a selected wireless device communicating over the network, wherein a first application category requires at least one of high throughput and low latency and a second application category requires an average throughput; and
   reducing a size of the buffer when the application category is the first application category;
   increasing the buffer size when the application category is the second application category; and
   generating an instruction to the wireless device to operate in carrier aggregation mode when available buffer space reaches a predetermined threshold.

10. The system of claim 9, wherein the first application category includes applications requiring peak instantaneous throughput.

11. The system of claim 9, wherein identifying the application category includes reviewing an attach requests received from the selected wireless device, the attach request including application characteristics.

12. The system of claim 9, wherein the first application category includes applications requiring a high quality of service.

13. The system of claim 9, wherein the first application category includes speed test applications, multimedia streaming applications, and gaming applications.

14. The system of claim 9, wherein the second application category includes applications requiring a low quality of service.

15. The system of claim 9, wherein the buffer includes space corresponding to the selected wireless device and the operations include reducing a size of the buffer space corresponding to the selected wireless device.

16. A processing node for dynamically modifying a buffer in a network deploying multiple carriers, wherein multiple wireless devices communicate over the network and each wireless device runs at least one of multiple applications, each application belonging to an application category, the processing node performing operations comprising:
   identifying the application category for a selected wireless device communicating over the network, wherein a first application category requires at least one of high throughput and low latency and a second application category requires an average throughput;
   reducing a size of the buffer for the selected wireless device when the application category is the first application category and increasing the size of the buffer for the selected wireless device when the application category is the second application category; and
   generating an instruction for the selected wireless device to operate in carrier aggregation mode when available buffer space reaches a predetermined threshold.

17. The processing node of claim 16, wherein identifying the application category includes reviewing an attach requests received from the selected wireless device, the attach request including application characteristics.

18. The processing node of claim 16, wherein the operations further comprise generating an instruction for the selected wireless device to operate in carrier aggregation mode when available buffer space reaches a predetermined threshold.

* * * * *